United States Patent [19]

Schmidt

[11] 3,995,317

[45] Nov. 30, 1976

[54] HELICAL SCAN APPARATUS FOR VIDEO TAPE OR THE LIKE AND HAVING ROTATING-HEAD INCLINATION-ADJUSTMENT MEANS

[75] Inventor: Erhard Schmidt, Furth, Germany

[73] Assignee: GRUNDIG E.M.V. Elektro-Mechanische Versuchsanstalt Max Grundig, Furth, Germany

[22] Filed: June 23, 1975

[21] Appl. No.: 589,535

[30] Foreign Application Priority Data

June 27, 1974 Germany.......................... 2430893

[52] U.S. Cl................................ 360/109; 360/107; 360/130
[51] Int. Cl.².................... G11B 21/24; G11B 5/56; G11B 21/04; G11B 5/52
[58] Field of Search .......................... 360/107–109, 360/128–130, 10, 75, 84, 85

[56] References Cited
UNITED STATES PATENTS

| | | |
|---|---|---|
| 3,235,670 | 2/1966 | Kihara ................................. 360/130 |
| 3,375,331 | 3/1968 | Okazaki et al..................... 360/130 |
| 3,435,154 | 3/1969 | Kihara ................................ 360/130 |
| 3,567,869 | 3/1971 | Hirota et al......................... 360/107 |
| 3,697,676 | 10/1972 | Protas................................ 360/130 |

OTHER PUBLICATIONS

Price, "Video Tape Recorder with Oscillating Head", IBM Tech. Disc. Bull. vol. 12, No. 1, June 1969, p. 33.

Primary Examiner—Robert S. Tupper
Attorney, Agent, or Firm—Michael J. Striker

[57] ABSTRACT

A helical scan recording and playback apparatus wherein magnetic video tape forms a helix about the peripheral surfaces of two coaxial drums which define an annular gap for magnetic heads which orbit in a chamber between the drums and engage inclined tracks at the inner side of the helix. The heads are mounted on a disk which is rotatable on a sleeve surrounding with clearance a shaft for the drums and having an internal protuberance which is tiltable with respect to the periphery of the shaft by a rod extending through an opening in the flange of one of the drums. The inclination of the plane of orbital movement of the heads relative to the central symmetry plane of the gap is changed when the speed of lengthwise movement of tape during playback deviates from the speed of lengthwise movement of tape during recording.

8 Claims, 2 Drawing Figures

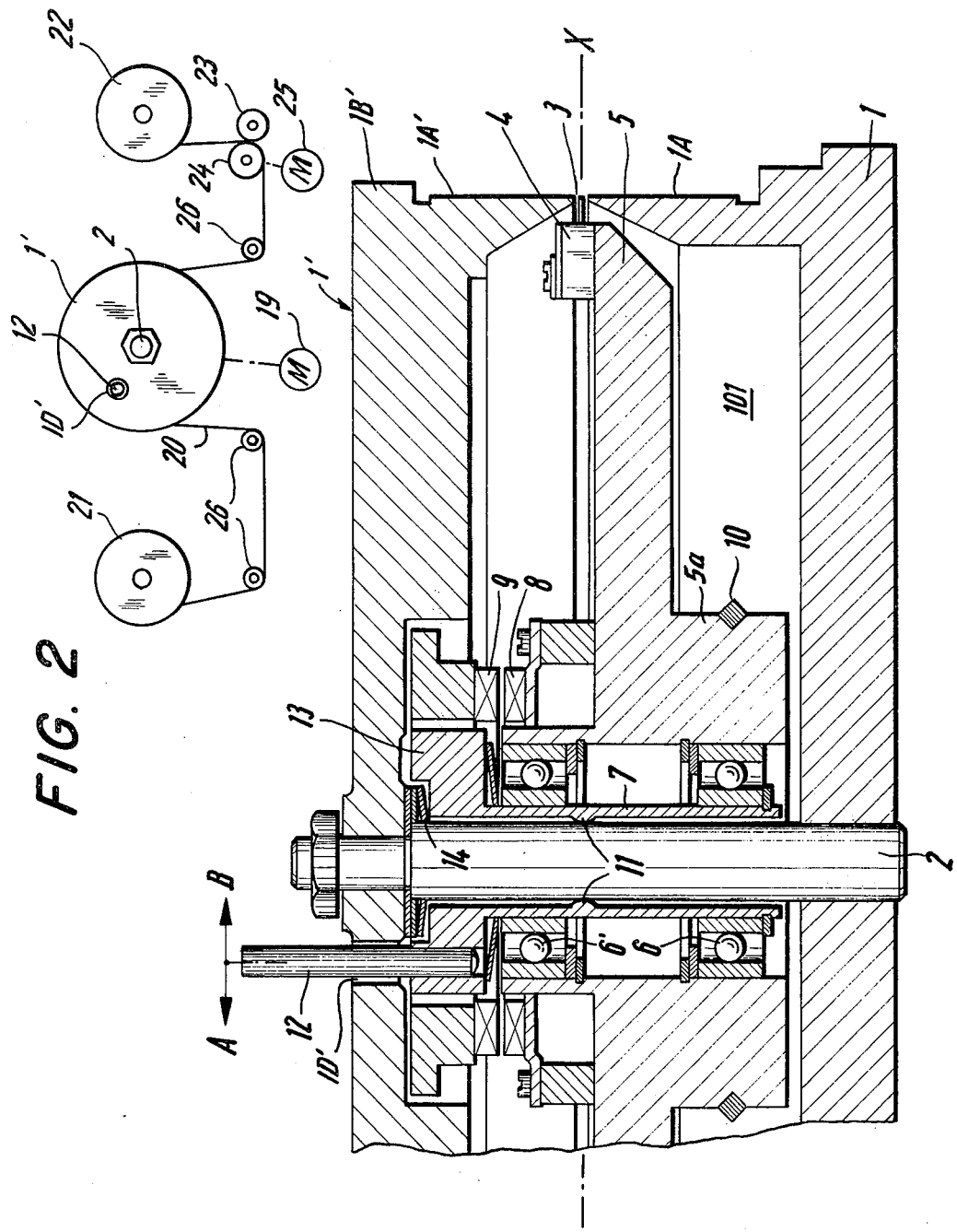

HELICAL SCAN APPARATUS FOR VIDEO TAPE OR THE LIKE AND HAVING ROTATING-HEAD INCLINATION-ADJUSTMENT MEANS

BACKGROUND OF THE INVENTION

The present invention relates to apparatus for recording and/or reproducing high-frequency information on magnetic tape, and more particularly to a mechanism for guiding magnetic tape and one or more magnetic heads in such apparatus.

It is already known to guide magnetic tape along the peripheral surfaces of two coaxial drums which define an annular gap for one or more magnetic heads mounted in the interior of the drum and serving to record or reproduce information on the tape. The diameters of the peripheral surfaces are identical or nearly identical and the portion of tape which engages such peripheral surfaces forms a helical loop (e.g., an alpha loop or an omega loop). One of both drums may be driven or head against rotation about their common axis. The magnetic head or heads are mounted on a carrier or bracket which relates about the common axis of and is located between the drums. The plane in which the carrier rotates the head or heads coincides with the central plane of the gap between the peripheral surfaces of the drums.

In recording-reproducing apparatus which employ video tape, the speed at which the tape moves during recording may but need not equal the tape speed during reproduction. Thus, it is often desired to accelerate the reproduction, to make slow-motion reproductions of recorded information or to reproduce still images of a particular subject or scene. This creates problems in the aforedescribed apparatus wherein the tape portions which is trained around the peripheral surfaces of the drums forms a helix. As is known, such guidance of the tape is desirable because it allows for relatively high signal density in each of the scan lines which is particularly desirable in connection with recording of television signals, i.e., an entire image can be recorded on a single relatively long track. The track makes an acute angle with the marginal portions of the tape. The inclination of the track is determined primarily by two factors, namely by inclination of the tape with respect to the common axis of the drums and by speed of lengthwise movement of the tape. If the direction of movement of the tape about the drums is identical with the direction of rotation of the heads, the inclination of the track with respect to the marginal portions of the tape increases with increasing speed of the tape. On the other hand, the inclination of the track decreases if the tape is being advanced counter to the direction of rotation of the heads and the speed of the tape increases.

If the speed of reproduction in a video system is less than the speed during recording, i.e., if the reproduction is to furnish a slow-motion or still-image effect, portions of the heads leave the adjacent tracks with the result that the quality of a substantial portion of the reproduced image is less than satisfactory, i.e., the reproduction takes place with a much less satisfactory signal to noise ratio.

Certain presently known helical scan apparatus are equipped with complex and expensive electronic systems which are designed to compensate for or suppress the just described phenomena. It is also known to employ a mechanical compensating system which is designed to change the path of tape with respect to the drums, i.e., to change the lead of the helical loop which engages the drums. Such proposal is not satisfactory because the tape undergoes undesirable deformation and also because the change in lead is not reproducible, with a requisite degree of accuracy owing to friction with the drums.

SUMMARY OF THE INVENTION

An object of the invention is to provide an apparatus which insures proper registry of magnetic heads with the inclined track on a helically wound magnetic tape by resorting to a small number of simple, rugged and inexpensive parts.

Another object of the invention is to provide s single mechanical device which maintains the magnetic heads of a helical scan apparatus in accurate register with the track even if the speed of magnetic tape during reproduction varies and deviates from the speed during recording.

A further object of the invention is to provide a helical scan apparatus with a device which insures accurate register of the magnetic head with inclined tracks on a helically looped magnetic tape during reproduction with slow-motion, still-image and/or acceleration effect.

The invention is embodied in a helical scan apparatus wherein information is recorded on or reproduced from magnetic tape which is moved lengthwise and forms a helix about the peripheral surfaces of two coaxial drums, wherein the peripheral surfaces of the drums define an annular gap for at least one magnetic head which orbits in a first plane and thereby engages inclined tracks at the inner side of the helix, and wherein the gap has a central symmetry plane which is normal to the common axis of the drums. The apparatus comprises a carrier (e.g., a disk) which supports the head or heads and is located between the drums, a belt transmission or analogous means for rotating the carrier to thereby orbit the head or heads along the gap, and means for changing the inclination of the first plane with respect to the symmetry plane of the gap when the speed of tape movement during reproduction (playback) deviates from the speed of tape movement during recording so as to conform the path of orbital movement of the head or heads to the inclination of tracks on the helix.

The inclination changing means preferably comprises a bearing assembly for the carrier and means for tilting the bearing assembly with respect to the common axis of the drums.

The drums are mounted on a common shaft and the bearing assembly preferably comprises a sleeve which is disposed intermediate the drums and rotatably supports the carrier. The sleeve has an internal surface which spacedly surrounds the shaft and has a preferably annular protuberance (e.g., a spherical or prismatic bearing) which tiltably engages the periphery of the shaft. The tilting means is actuatable to change the inclination of the sleeve which is coaxial with the carrier so that the inclination of the first plane with respect to the symmetry plane changes in response to tilting of the sleeve. The protuberance is preferably located in or immediately adjacent to the symmetry plane. The sleeve is held against axial movement relative to the shaft.

The novel features which are considered as characteristic of the invention are set forth in the appended claims. The improved helical scan apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmetary partly diagrammatic axial sectional view of a helical scan apparatus which embodies the invention; and FIG. 2 is a smaller-scale plan view of the apparatus.

DESCRIPTION OF THE PREFERRED EMBODIMENTS

FIG. 1 shows a portion of the improved helical scan apparatus which comprises two coaxial drums 1 and 1' having peripheral surfaces 1A, 1A' of identical or nearly identical diameter and serving to guide a video tape 20 (FIG. 2) which can form a so-called alpha or a so-called omega loop (omega loop shown in FIG. 2). The drums 1 and 1' are mounted on a common shaft 2 and their peripheral surfaces 1A, 1A' are spaced apart to define an annular clearance or gap 3 surrounding the endless path of one or more magnetic heads 4 mounted on a disk-shaped carrier 5 which is tiltably mounted on the shaft 2 in the chamber or space 101 defined by the drums 1 and 1'. As a rule, the carrier 5 supports two heads 4 which are located diametrically opposite each other with respect to the axis of the shaft 2. The hub 5a of the carrier 5 is mounted on two antifriction ball bearings 6, 6' which surround a tiltable bearing sleeve 7 mounted in the chamber 101 and having an internal surface surrounding, with certain clearance, the shaft 2.

The energy source for the head or heads 4 includes a transformer having a rotor 8 mounted on the carrier 5 and a stator 9 mounted in the drum 1'. The means for rotating the carrier 5 includes a drive having a motor 19 (FIG. 2) an endless belt or cord 10 engaging a sheave-like portion of the hub 5a.

The internal surface of the bearing sleeve 7 has an annular bearing portion or protuberance 11 which engages with the peripheral surface of the shaft 2 in or very close to the central symmetry plane X—X of the gap 3. The aforementioned clearance between the internal surface of the bearing sleeve 7 and the peripheral surface of the shaft 2 has a first portion at one side and a second portion at the other side of the bearing portion 11. The upper end of the bearing sleeve 7 (as viewed in the drawing) has a larger-diameter portion or collar 13 which is connected with a pin- or rod-shaped tilting member 12 extending with clearance through an opening ID' in the flange 1B' of the drum 1'. If the member 12 is pushed or pulled in the direction indicated by arrow A or B, or moved axially, the sleeve 7 is tilted with respect to the shaft 2 and thereby changes the inclination of the plane of orbital movement of heads 4 with respect to the symmetry plane X—X of the gap 3. Thus, by moving the member 12, one can move the tape-contacting portion of the head 4 above or below the central plane of the gap 3. This enables the head 4 to conform to the changed position of scan lines on video tape 20 which is being moved along the gap 3, with or relative to the peripheral surface 1A and/or 1A'. The position tracks on the tape with respect to the head 4 changes if the speed of tape, during reproduction of information, deviates from the speed during recording. A package of dished springs 14 is interposed between the flange 1B' and the collar 13 to bear against the collar and to bias the sleeve 7 to a desired neutral position while permitting for tilting of the sleeve in response to shifting of the member 12. The carrier 5 shares the tilting movements of sleeve 7 under the action of the member 12. In FIG. 1, the plane of orbital movement of the heads 4 coincides with the symmetry plane X—X.

FIG. 2 shows that the tape 20 is being paid out by a supply reel 21 and is being collected by a takeup reel 22. The means for moving the tape 20 lengthwise comprises a pinch roller 23, a capstan 24 and a motor 25 which drives the capstan 24. Rollers 26 guide the tape 20 between the reel 21 and the peripheral surfaces 1A, 1A' of the drums 1, 1' (only the drum 1' is shown in FIG. 2) as well as between such peripheral surfaces and the capstan 24. The carrier 5 is driven by the aforementioned motor 19. The means for tilting or otherwise moving the rod 12 relative to the shaft 2 is not shown in FIG. 2.

The tiltable mounting of carrier 5 with bearing assembly 6, 6', 7, 11 can be modified in a number of ways without departing from the spirit of the invention. For example, the antifriction bearings 6, 6' can be replaced with a single bearing located in the plane of the gap 3. Moreover, one can replace the protuberance 11 with a tiltable prismatic or spherical antifriction bearing. All that counts is to insure that the carrier 5 can be tilted relative to the gap 3 and preferably rotated relative to the shaft 2 while the helical scan apparatus is in use. It has been found that the illustrated arrangement performs quite satisfactorily and can stand long periods of use.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a helical scan apparatus wherein information is recorded on or reproduced from magnetic tape which is moved lengthwise and forms a helix about the peripheral surfaces to two coaxial drums which surround a shaft, wherein the peripheral surfaces of said drums define an annular gap for at least one magnetic head which orbits in a first plane and thereby engages inclined tracks of said helix, and wherein said gap has a central symmetry plane which is normal to the common axis of said drums, a combination comprising a carrier for said head, said carrier being disposed between said drums; means for rotating said carrier to thereby orbit said head along said gap; and means for changing the inclination of said first plane relative to said symmetry plane when the speed of tape movement during reproduction deviates from the speed of tape movement during recording so as to conform the path of said head to the inclination of tracks on said helix, comprising a bearing assembly for said carrier and including a sleeve intermediate said drums and rotatably supporting said carrier coaxial with the same, said sleeve having an internal surface spacedly surrounding said shaft and having a protuberance tiltably engaging the periphery of said shaft, and tilting means actuatable for tilting said bearing assembly with respect to the common axis of said drums to thereby change the inclination of said sleeve.

2. A combination as defined in claim 1, wherein said protuberance is an annulus.

3. A combination as defined in claim 1, wherein said protuberance engages said shaft in said symmetry plane.

4. A combination as defined in claim 1, wherein said protuberance is a bearing.

5. A combination as defined in claim 1, further comprising means for yieldably urging said sleeve to a position in which said carrier is coaxial with said drums.

6. A combination as defined in claim 1, wherein one of said drums has an opening and said tilting means comprises a rod rigid with said sleeve and extending through said opening.

7. A combination as defined in claim 1, further comprising antifriction bearing means interposed between said carrier and said sleeve.

8. A combination as defined in claim 1, further comprising an energy source for said head, including a rotor mounted on said carrier and electrically connected with said head and a stator mounted on said bearing assembly adjacent to said rotor.

* * * * *